Nov. 4, 1930.    J. F. PRIBNOW ET AL    1,780,886
CIRCULAR SAW SHARPENING MACHINE
Filed Feb. 23, 1928    4 Sheets-Sheet 1

INVENTORS
John F. Pribnow
Eugene F. Mitchell
ATTORNEY

Fig. 3.

Nov. 4, 1930.  J. F. PRIBNOW ET AL  1,780,886
CIRCULAR SAW SHARPENING MACHINE
Filed Feb. 23, 1928   4 Sheets-Sheet 4

INVENTORS.
John F. Pribnow
Eugene F. Mitchell
ATTORNEY

Patented Nov. 4, 1930

1,780,886

UNITED STATES PATENT OFFICE

JOHN F. PRIBNOW, OF SAN DIEGO, CALIFORNIA, AND EUGENE F. MITCHELL, OF SPOKANE, WASHINGTON; SAID MITCHELL ASSIGNOR TO ARTHUR W. PRIBNOW, OF SAN DIEGO, CALIFORNIA; M. L. SCHULTZ ADMINISTRATOR OF SAID JOHN F. PRIBNOW, DECEASED

CIRCULAR-SAW-SHARPENING MACHINE

Application filed February 23, 1928. Serial No. 256,456.

Our invention relates to circular saw-sharpening machines.

Heretofore such machines as have been used for sharpening circular saws have been provided with only limited means for adjusting them to saws of various diameters and different types and forms of teeth; and such means as have been provided have been inconvenient and difficult to operate, consisting mainly in the substitution of one cam for another, which has required that the machine be stopped and partially dismounted, interrupting and stopping the work during such adjustments. Furthermore these machines have been slow in operation, in that the grinding head is held stationary while the grinding wheel is in engagement with the tooth of the saw being sharpened.

The object of our invention is to provide a saw-sharpening machine adapted to be conveniently and easily adjusted for sharpening all diameters of circular saws and forms of teeth; without interrupting the operation of the machine. Such adjustments are operated by inter-related cams controlled by the operator, which are so timed and connected as to be adjusted quickly, and simultaneously with the removal of one saw from the machine and the replacing of another thus resulting in considerable saving in time and labor.

Another object of our invention is to provide a saw-sharpening machine the grinding head of which is adapted to be in motion while the grinding wheel is in engagement with the tooth of the saw thus materially lessening the time in which a saw may be sharpened.

Still another object of our invention is to provide positive and accurate means for adjusting the grinding head relatively to the saw to be ground, so that the teeth of each saw and of successive saws will be ground uniformly and accurately.

A further object of our invention is to provide a relatively simple and practical machine adapted for economically and rapidly sharpening circular saws, which may be used continuously, which can not easily get out of order or break down and which only requires the attention of one attendant or operator.

A still further object of our invention is to provide a saw-sharpening machine adapted to automatically and successively sharpen each tooth of a circular saw, after the saw has been placed in the machine, without further attention from the operator other than to make the necessary initial adjustments.

These objects and other incidental features of our invention and the construction and mode of operation thereof are hereinafter described in detail with reference to the accompanying drawings, in which.

Referring now to the figures, our invention comprises a housing 1 in which is contained and supported the mechanism of our saw-sharpening machine and on which is mounted an arcuate arm 2, pivoted in and extending above the upper wall of the casing on a pin 3.

A vertical stub shaft 7 is journaled in the upper portion of the arm 2, as at 8, which is provided on its lower end with a frame 7ª supporting an electric motor 6, the spindle 5 of the motor having a suitable grinding wheel 4 mounted thereon and which is adapted to be held adjacent the saw to be sharpened, hereinafter described.

A circular saw 9 to be sharpened is shown, mounted on an arbor 10 and adapted to be guided by a finger 11 pivoted on an eccentrically mounted block 12 on the frame 1 and rotated by a lever 13 which will move the finger laterally to and from the saw 9 to accommodate saws of various thicknesses.

Figure 1:
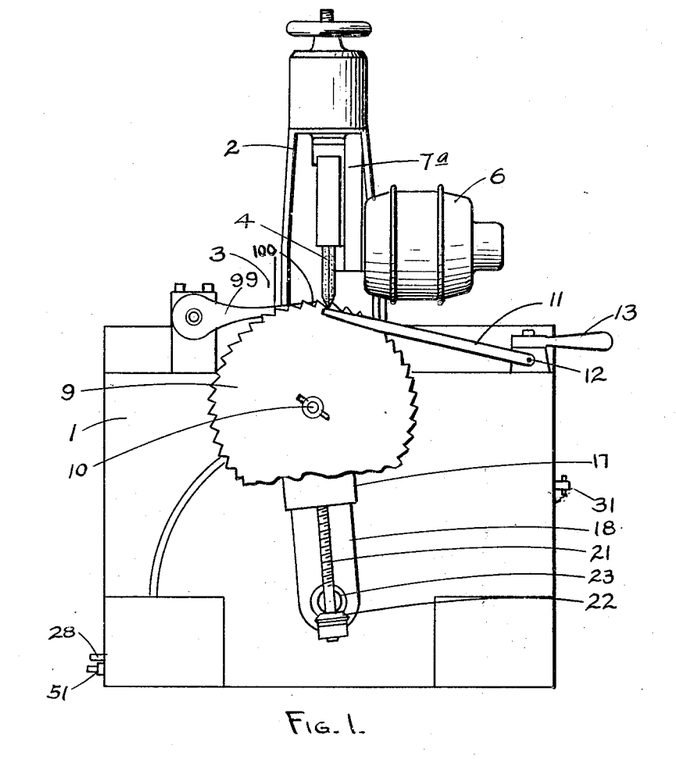
Fig. 1 shows a front elevation of our saw-sharpening machine and illustrates the relative positions of the grinding head and the saw mounted thereon.
Figure 2:
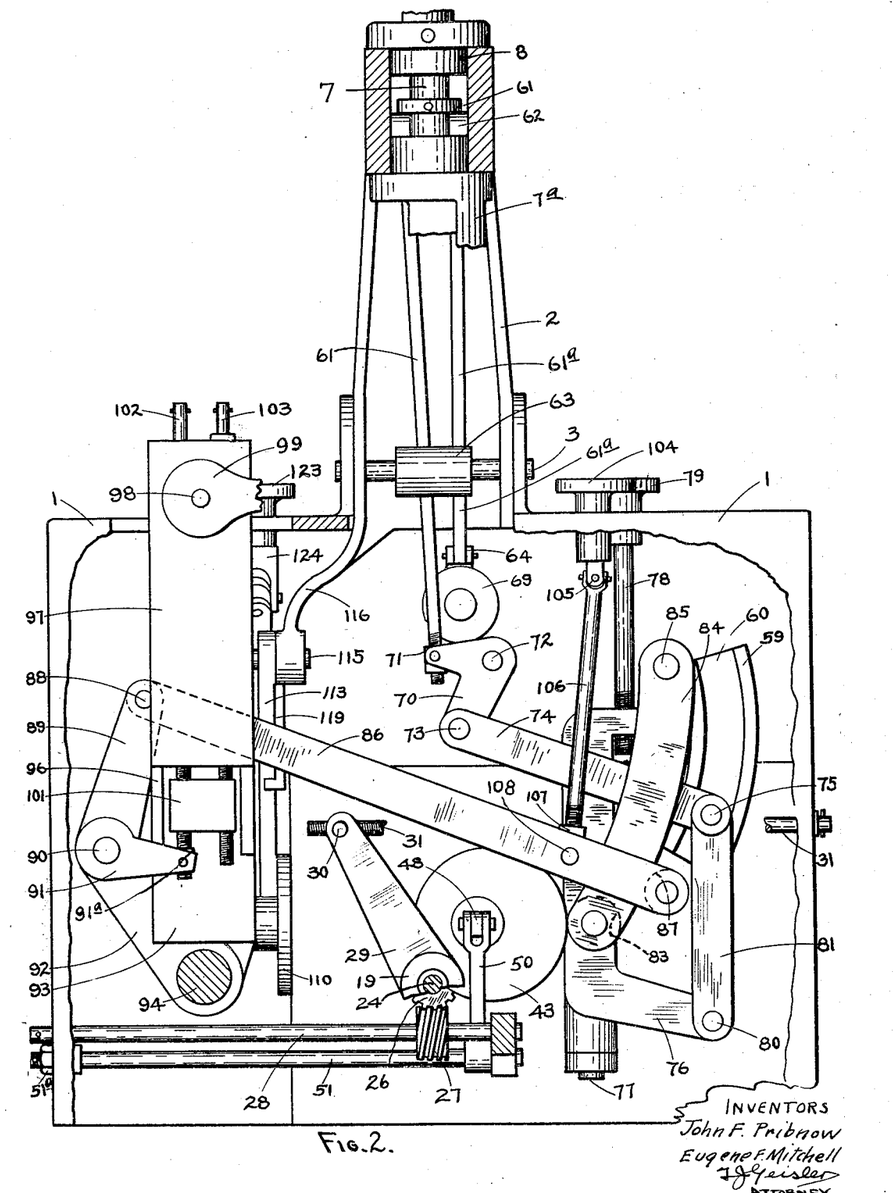
Fig. 2 shows an enlarged front elevation, similar to Fig. 1, the front wall of the casing being broken away to disclose the mechanism contained therein.
Figure 3:
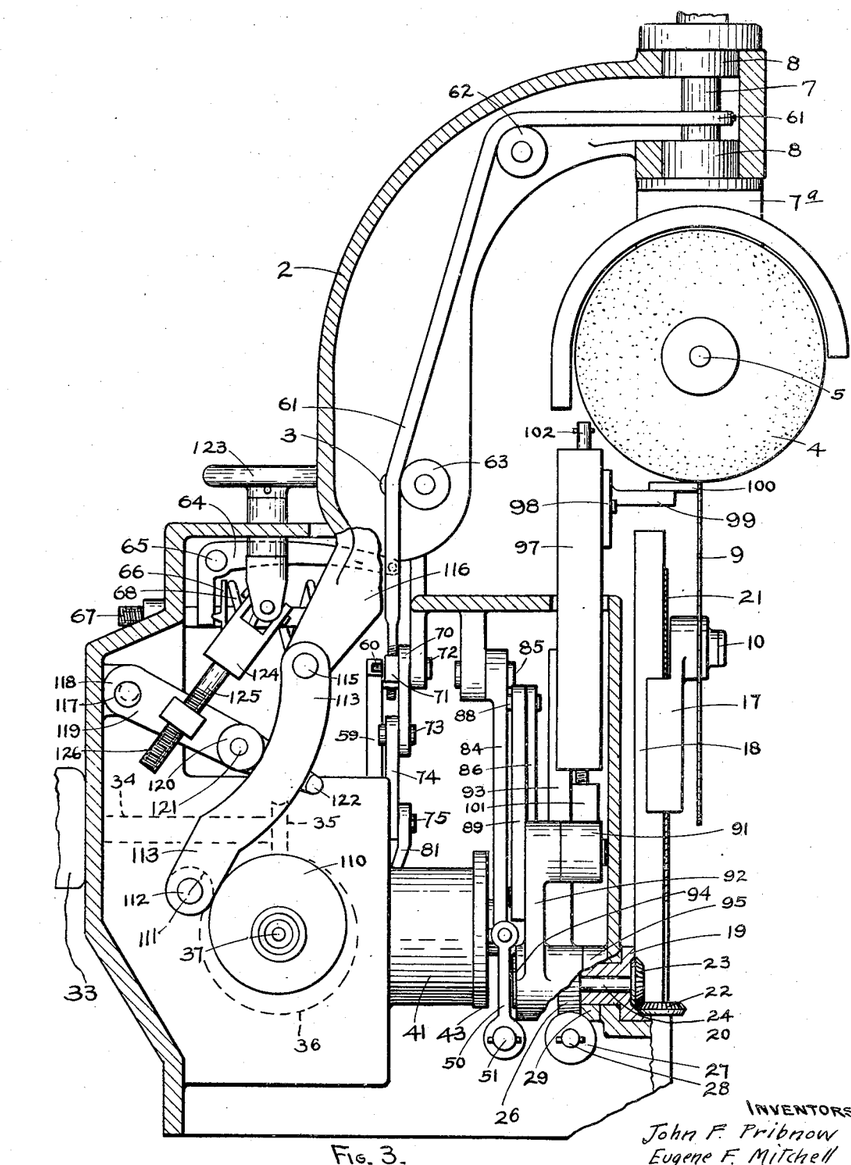
Fig. 3 shows a side elevation of our machine with the adjacent wall of the casing cut away to disclose further details of construction.

To enable the grinding wheel 4 to be adjusted relatively to the diameter of the saw and the angle of the tooth to be ground, we have provided a block 17, Figs. 2 and 3 in which the arbor 10 is rotatably mounted, and which is slidably secured on a swinging arm 18, fast at its lower end on a hollow shaft 19 journaled as at 20.

On the inner end of the hollow shaft 19 is secured a lever arm 29, Fig. 2, carrying at its outer end a swiveled nut 30 in which is threaded an adjusting rod 31 journaled in the wall of the casing and extending outside to a convenient point to be operated by a wrench, whereby the arm 18 may be adjusted laterally in an arcuate path to bring the teeth of the saw into proper angular relation with the grinding wheel preparatory to the grinding of the saw.

A threaded shaft 21 is mounted in the block 17, Fig. 3, provided on its lower end with a bevel gear 22 meshing with a companion gear 23, secured to a shaft 24 mounted within and projecting through the sleeve 19 which carries on its inner end a spiral gear 26, Fig. 2, meshing with a worm 27 fast on the end of an adjusting rod 28, journaled at each end in the casing, one end projecting therethrough, in order that it may be conveniently rotated by the operator, by means of a suitable wrench, to adjust the saw vertically in order to bring it into proper relation to the grinding wheel.

Figure 4:
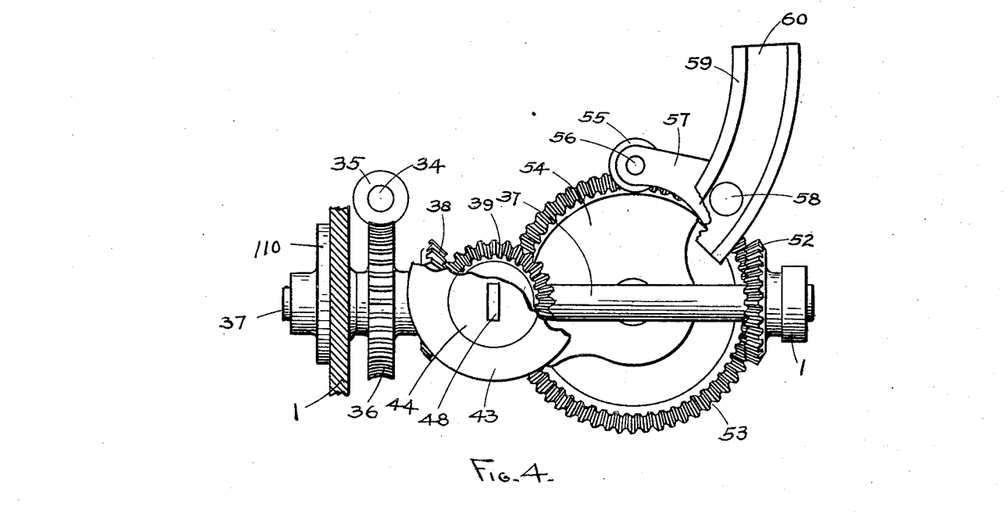
Fig. 4 shows a fragmentary elevation of a portion of our machine illustrating further details of construction.
Figure 5:
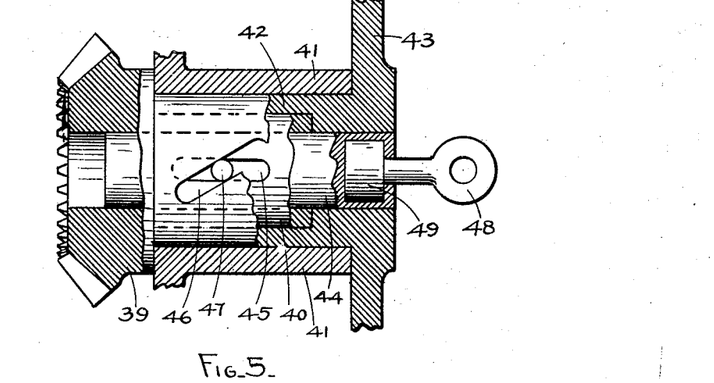
Fig. 5 shows in an enlarged fragmentary, longitudinal section, a portion of the control mechanism, and illustrates further details of construction thereof.

On the rear wall of the casing 1 is mounted a motor 33, Fig. 3, its shaft 34 extending through the casing and provided with a worm 35, Fig. 4, which drives a spiral gear 36 fast on the end of a transverse shaft 37 also journaled in the casing. A bevel gear 38 is also provided on the said shaft meshing with a gear 39, integral with a sleeve 40, Fig. 5, which is mounted on a shaft 44 contained in a housing 41. Between the sleeve 40 and the housing 41 is arranged a hub 42, the outer end of which forms an eccentric cam 43.

Spiral grooves 46 are provided in the sleeve 42 and longitudinal grooves 45 are provided in the hub 40, in which oppositely arranged pins 47 fast on the shaft 44 project, so that the relative positions of the eccentric cam 43 and the gear may be shifted by moving the shaft 44, longitudinally by means of an eye 48 fast on its end and connected with an arm 50, Fig. 2, fast on a shaft 51, which extends through the wall of the housing to a convenient position to be rotated by a suitable wrench, on which is provided a lock nut 51a.

On the shaft 37, Fig. 4, at its other end is also secured another bevel gear 52 driving a companion gear 53 journaled on a stub shaft mounted on the rear wall of the casing and carrying on its face an irregularly shaped cam 54.

A cam roller 55 is provided, mounted by means of a pin 56 on a cam arm 57, which bears on the cam 54. The cam arm is rigidly secured to a stub shaft 58 journaled in the wall of the casing which also carries an arm 59 rigidly secured thereto at approximately right angles with the arm 57 in which is provided a groove 60. Arranged in the slot 60 is a pin 75 rotatably carried in the end of a link 81 which is pivoted at its other end to a frame 76, slidably mounted over a vertical rod 77 carried by the floor of the housing. A screw 78 is threaded into the frame 76 and extends upwardly thru the housing and is provided on its upper end with an operating handle 79.

A lever 74 is also secured to the pin 75 and connected at its other end to a bell crank lever 70, pivoted at 72 to the casing.

Figure 6:
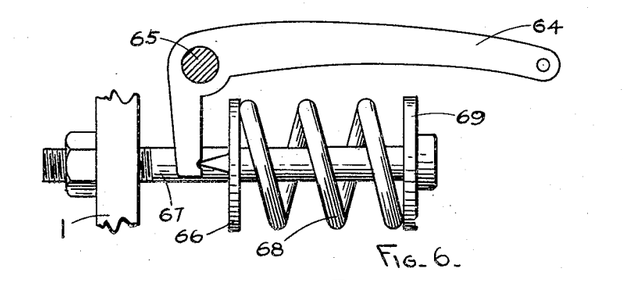
Fig. 6 shows a fragmentary view of another portion of our machine and illustrates further details of construction.

The other end of the bell crank lever 72 is fastened to a swivel nut 71, in which is threaded one end of a flexible member 61, which is passed upwardly inside the arm 2, over suitable friction rollers 62 and 63 and about the stub shaft 7, to which it is secured and downwardly again, its end 61a being fastened to a bell crank lever 64, Fig. 6. The other end of the bell crank lever 64 bears against a plate 66, slidably mounted on a rod 67, on which is mounted an expansion coil spring 68, held on the rod by a washer 69, thus providing a resilient tensioning means for the arcuate arm 2.

By this construction, rotation of the cam 54 by the gear 53 will cause the cam arm 57 and the arcuate arm 59 to oscillate on each side of its position. This oscillation will cause the lever 74 to move longitudinally and actuate the rocker arm 70 to move the flexible member 61 lengthwise and cause the grinder head to be oscillated in a horizontal plane, the spring 68 connected to the other end of the flexible member 61a functioning to return the grinder head to the other end of its arc. As shown in Fig. 2, the pin 75 is in such a position that the oscillation of the arm 59 will transmit no longitudinal movement to lever 74 and no horizontal motion will be transmitted to the grinder head, however, by adjusting the frame 76 vertically, the pin 75 will be shifted so that the oscillation of the arm 59 will transmit a greater or less degree of motion on each side of its central portion according to the adjustment of the pin 75. By this means each tooth of a saw may be automatically and adjustably beveled on alternate sides by the grinding wheel with equal and opposite angles to that of the other or only transversely of the saw teeth as the case may be.

Returning now to the cam 43, a roller 83 is adapted to bear against the said cam, Fig. 2, which is carried on the lower end of a curved arm 84, pivoted on a pin 85, supported in the housing. A lever 86, provided with a roller 87 on its end which bears on the outer edge of the arm 84, is pivotally fastened at 88 to a lever 89. This lever is secured by a pin 90 on which is also fastened a lever 91 and an arm 92 integral with a guide arm 93 the guide arm being pivoted on a pin 94 supported from the housing by a boss 95.

Sliding in guideways 96 provided on the arm 93, is a housing 97 provided near its upper end with a pin 98 on which is supported an arm 99 terminating in a feed finger 100 Fig. 1 adapted to engage the teeth of the saw.

On the face of the arm 93 is provided a lug 101 in which are threaded two vertical, adjusting rods 102 and 103 which extend through the housing 97 and terminate in a position convenient for the operator to rotate by means of a wrench. The rod 103 is threaded in the housing 97 and provides means for moving the housing 97 longitudinally on the guides 96. The rod 102 passes freely through the block 97 and is threaded at its lower end in a swivel nut 91ª secured on the lever arm 91, previously described.

Mounted in the upper wall of the housing is an adjusting knob 104 provided with a universal joint 105 connecting it with a rod 106 threaded on its lower end in a swivel nut 107, pivotally fastened on a pin 108 to the connecting link 86. By rotating the rod 106 the link 86, previously described, will be raised or lowered and the roller 87 will engage the outer edge of cam 84 at a greater or less distance from its pivot 85 and provide adjustment for the stroke of the feed finger 100.

By rotating the adjusting rod 102, the arms 89 and 91 will shift the housing 97 vertically to raise or lower the feed finger 100 to conform to the diameter of the saw being ground, which is adapted to rotate the saw one tooth at a time, as each tooth is ground successively, the mechanism of which is more fully described and claimed in a patent issued to J. F. Pribnow, August 25, 1925, Number 1,551,054 and entitled Saw grinding machine.

On the left hand end of the shaft 37, Figs. 3 and 4, is secured the eccentric cam 110, previously described, on which bears a cam roller 111 carried at 112, in the end of a cam arm 113 the other end of which is pivoted at 115 to the lower end of an arm 116 depending from the arcuate arm 2, on which the grinding head is mounted.

Pivoted on a pin 117 in lugs 118 is a lever 119 provided with a roller 120 mounted on pin 121 which bears against the adjacent edge of the arm 113. A lug 122 is also provided on the end of the arm 119 which engages the outer edge of cam arm 113 thus the arm 113 is held securely between the roller 120 and the lug 122.

In order to take up the wear of the roller 120 and the cam arm 113, the pin 117 is mounted eccentrically in the arm 119, so that by rotating the said pin 117 the center of rotation of the arm 119 will be shifted, thus moving it to or from the arm 113.

By these means the rotation of the cam 110 moves the arm 113 laterally on the roller 120 as a fulcrum, and causes the arcuate arm 2 to be moved up and down, thus carrying the grinding wheel alternately downward to grind the tooth of the saw, and upward to permit the saw to be shifted by the finger 100 to position for grinding the next adjacent tooth.

By means of the handwheel 123 the roller 120 may be shifted, thus moving the fulcrum of the arm 113 and varying the degree of movement of the arcuate arm 2 and the grinding head.

In the operation of our machine, a circular saw having been clamped on the mandrel, the block 17 will be adjusted vertically to bring the saw into proper relation with the guide finger 11 and the feed finger 100 by the adjusting rod 28, and the block 17 will be moved laterally to provide the proper angular adjustment of the grinding wheel to the type of tooth to be ground, by the adjusting rod 31.

Then the vertical movement of the arcuate arm 2, will be adjusted by the hand wheel 123, in order to only move a distance equal to the depth of the tooth of the saw and sufficiently to clear its point.

In this connection the pivot point of the arm 2, being in the same horizontal line as the middle point between the two extremes of the vertical movement of the head and the middle point between the point of the saw tooth, and its base, the amount of travel of the point at which the grinding wheel is in engagement with the saw tooth from a vertical line is almost negligible, and in effect is the same as though the grinding wheel were actually moved in a vertical line.

This is important in that the period during which the grinding head will be motionless may be materially lessened, since the grinding wheel may be brought into contact with the saw, as it begins its downward movement, and remains in contact until it is raised to clear the tooth of the saw.

And since the grinding head is only raised sufficiently to clear the tooth of the saw, the movement of the grinding head is reduced to a minimum.

Further, as the teeth of most circular saws are beveled on alternate sides, the lateral movement of the arm 2, is adjusted by means of the operating knob 79 which will raise the frame 76 and alter the position of the pin 75 in the groove 60, which results in the arm 2 being swung in a greater or lesser arc, the center of which is the tooth being ground.

However, in case a circular saw is being sharpened, which is ground transversely of the plane of the saw, the pin 75, which bears in the groove 60 will be brought into a position as shown in Fig. 2 in which no lateral movement is imparted to the arm 2, and the head will be held rigidly transverse of the saw.

These initial adjustments are made before the grinding operation is started.

Then the motors 33 and 6 which drive the mechanism of our machine and the grinding wheel respectively are actuated, and the shaft 34 of the motor 33 will drive the cam 110, which will cause the arm 113 to oscillate the arm 2 vertically on its pivot as at 3 and at the same time the cam 42 causes the arm 2 to swing laterally from one end of its adjusted arc to the other and back again, and the vertical and lateral movements of the arm 2 are synchronized by means of the stub shaft 44 and the pins 47 bearing in the slots in the sleeve 40, and the hub 42 of the cam 43.

Therefore considering the operation of the machine as a whole, the arm 2 swings to one side, comes down to bring the grinding wheel into engagement with a bevel edge of the tooth, remains there a sufficient time, then raises and swings to the other side, and the operation is repeated.

Simultaneously and in time with the movement of the arm 2, the frame 93 is oscillated back and forth by means of the lever 86 which is actuated by the cam 43 and adjusted by the rod 102.

Thus, the finger 100 which is provided on the upper end of the frame 93, and is in engagement with a tooth of the saw, is moved longitudinally in time with the movements of the grinding head, to rotate the saw being ground, sufficiently to bring the next tooth into position, and is then withdrawn to be in position to repeat the operation in time with the grinding head.

The ratio of the gear 52 to the gear 53, which drives the shaft 54, is two to one, and the grinding head is thus raised and lowered and the saw feeding finger 100 is moved longitudinally twice during one complete lateral oscillation of the grinding head. Further the concentric portion of the cam 54 is so proportioned to the irregular part of the cam, that the head is held stationary only during the time the roller 55 travels over the concentric portion which is approximately forty per cent of the circumference, so that since the grinding head is raised and lowered twice during its lateral movement, the vertical movement of the grinding head is arrested for approximately twenty per cent of the time required for grinding the tooth. That is, the grinding wheel will remain in its lowermost position for that relative period of time then as it clears the point of the tooth, the saw feeding finger will move the next tooth to be ground into position, and the grinding head will be swung over to grind the opposite bevel on the next tooth, and the operation of sharpening a circular saw is thus effected rapidly and efficiently.

We claim:

1. In a saw sharpening machine, a supporting arm, a grinding head journaled in the supporting arm, a flexible member secured to the grinding head, tensioning means connected to one end of the said flexible member, cam controlled means connected to the other end of said flexible member adapted to move the flexible member lengthwise in one or more directions, and thus oscillate said grinding head and means adapted to adjust the relative positions of said cam controlled means while in motion to limit the degree of the oscillation of said grinding head.

2. A saw sharpening machine comprising, a housing, an arcuate arm, a grinding head carried by said arcuate arm, a driven shaft journaled in said housing, a cam fast on said driven shaft, a cam arm bearing on said cam and connected with said arcuate arm, said cam arm adapted to raise and lower said arcuate arm, a second cam journaled in the housing and driven by said shaft, an arm bearing against said second cam, a flexible member connected with said grinding head, one end of said flexible member connected to said second cam arm, the other end thereof connected to tensioning means mounted in said housing whereby said grinding head is oscillated in a horizontal plane by the movement of said second cam arm on said second cam and adjustable means controlling the rotation of said first mentioned cam with said second cam, whereby the vertical and horizontal movements imparted to said grinding head will be synchronized.

3. A saw sharpening machine comprising, a housing, an arcuate arm, a grinding head carried by said arcuate arm, a driven shaft journaled in said housing, a cam fast on said driven shaft, a cam arm bearing on said cam, and connected with said arcuate arm, said cam arm adapted to raise and lower said arcuate arm, a second cam journaled in the housing and driven by said shaft, an arm bearing against said second cam, a flexible member connected with said grinding head, one end of said flexible member connected to said second cam arm, the other end thereof connected to tensioning means mounted in said housing whereby said grinding head is oscillated in a horizontal plane by the movement of said second cam arm on said second cam and supplementary means for adjusting the relative degree of vertical and horizontal movement of said grinding head.

4. A saw sharpening machine comprising, a housing, an arcuate arm, a grinding head carried by said arcuate arm, a driven shaft journaled in said housing, a cam fast on said driven shaft, a cam arm bearing on said cam and connected with said arcuate arm, said cam arm adapted to raise and lower said arcuate arm, a second cam journaled in the housing and driven by said shaft, an arm bearing against said second cam, a flexible member connected with said grinding head, one end of said flexible member connected to said second cam arm, the other end thereof connected to tensioning means mounted in said housing whereby said grinding head is oscillated in a horizontal plane by the movement of said second cam arm on said second cam, adjustable means controlling the rotation of said first mentioned cam with said second cam whereby the vertical and horizontal movements imparted to said grinding head will be synchronized and supplementary means for adjusting the relative degree of vertical and horizontal movement of said grinding head.

5. A saw sharpening machine comprising, a housing, an arcuate arm, a grinding head carried by said arcuate arm, a driven shaft journaled in said housing, a cam fast on said driven shaft, a cam arm bearing on said cam and connected with said arcuate arm, said cam arm adapted to raise and lower said arcuate arm, a second cam journaled in the housing and driven by said shaft, an arm bearing against said second cam, a flexible member connected with said grinding head, one end of said flexible member connected to said second cam arm, the other end thereof connected to tensioning means mounted in said housing, whereby said grinding head is oscillated in a horizontal plane by the movement of said second cam arm on said second cam, adjustable means controlling the rotation of said first mentioned cam with said second cam whereby the vertical and horizontal movements imparted to said grinding head will be synchronized, supplementary means for adjusting the relative degree of vertical and horizontal movement of said grinding head and adjustable saw supporting means provided on the housing.

6. A saw sharpening machine comprising, a housing, an arcuate arm, a grinding head carried by said arcuate arm, a driven shaft journaled in said housing, a cam fast on said driven shaft, a cam arm bearing on said cam and connected with said arcuate arm, said cam arm adapted to raise and lower said arcuate arm, a second cam journaled in the housing and driven by said shaft, an arm bearing against said second cam, a flexible member connected with said grinding head, one end of said flexible member connected to said second cam arm, the other end thereof connected to tensioning means mounted in said housing whereby said grinding head is oscillated in a horizontal plane by the movement of said second cam arm on said second cam, adjustable means controlling the rotation of said first mentioned cam with said second cam, whereby the vertical and horizontal movements imparted to said grinding head will be synchronized, supplementary means for adjusting the relative degree of vertical and horizontal movement of said grinding head, adjustable saw supporting means provided on the housing and means for rotating said saw to bring each tooth successively in position to be operated upon by said grinding head.

7. A saw sharpening machine comprising a housing, an arcuate arm, a grinding head carried by said arcuate arm, a driven shaft journaled in said housing, a cam fast on said driven shaft, a cam arm bearing on said cam and connected with said arcuate arm, said cam arm adapted to raise and lower said arcuate arm, a second cam journaled in the housing driven by said shaft, an arm bearing against said second cam, a flexible member connected with said grinding head, one end of said flexible member connected to said second cam arm, the other end thereof connected to tensioning means mounted in said housing whereby said grinding head is oscillated in a horizontal plane by the movement of said second cam arm on said cam, adjustable means controlling the rotation of said first mentioned cam with said second cam, whereby the vertical and horizontal movement imparted to said grinding head will be synchronized, a second threaded shaft journaled in said housing, an arbor bearing the saw to be sharpened mounted for longitudinal movement thereon, means for rotating said second shaft and other means for moving said second shaft arcuately laterally in the plane of the saw and a second finger guiding said saw relatively to said grinding head.

8. A saw sharpening machine comprising a housing, an arcuate arm, a grinding head carried by said arcuate arm, a driven shaft journaled in said housing, a cam fast on said driven shaft, a cam arm bearing on said cam and connected with said arcuate arm, said cam arm adapted to raise and lower said arcuate arm, a second cam journaled in the housing driven by said shaft, an arm bearing against said second cam, a flexible member connected with said grinding head, one end of said flexible member connected to said second cam arm, the other end thereof connected to tensioning means mounted in said housing whereby said grinding head is oscillated in a horizontal plane by the movement of said second cam arm on said cam, adjustable means controlling the rotation of said first mentioned cam with said second cam, whereby the vertical and horizontal movement imparted to said grinding head will be synchronized, a second threaded shaft journaled in said housing, an arbor bearing the saw to be sharpened mounted for longitudinal movement thereon, means for rotating said second shaft and other means for moving said second shaft arcuately laterally in the plane of the saw and a saw feeding finger engaging a tooth of the saw and means for moving said saw feeding finger laterally in time with the movement of said grinding head and means for adjusting said finger relatively to the saw.

9. A saw sharpening machine comprising a housing, an arcuate arm, a grinding head carried by said arcuate arm, a driven shaft journaled in said housing, a cam fast on said driven shaft, a cam arm bearing on said cam and connected with said arcuate arm, said cam arm adapted to raise and lower said arcuate arm, a second cam journaled in the housing driven by said shaft, an arm bearing against said second cam, a flexible member connected with said grinding head, one end of said flexible member connected to said second cam arm, the other end thereof connected to tensioning means mounted in said housing whereby said grinding head is oscillated in a horizontal plane by the movement of said second cam arm on said cam, adjustable means controlling the rotation of said first mentioned cam with said second cam, whereby the vertical and horizontal movement imparted to said grinding head will be synchronized, a second threaded shaft journaled in said housing, an arbor bearing the saw to be sharpened mounted for longitudinal movement thereon, means for rotating said second shaft and other means for moving said second shaft arcuately laterally in the plane of the saw, a saw feeding finger engaging a tooth of the saw and means for moving said saw feeding finger laterally in time with the movement of said grinding head and a second finger guiding said saw relatively to said grinding head.

10. A saw sharpening machine comprising a housing, an arcuate arm, a grinding head carried by said arcuate arm, a driven shaft journaled in said housing, a cam fast on said driven shaft, a cam arm bearing on said cam and connected with said arcuate arm, said cam arm adapted to raise and lower said arcuate arm, means for adjusting the relative degree of vertical movement of said arcuate arm comprising a link pivoted at one end in said housing and slidably connected at the other end with said cam arm, means for moving said link longitudinally on said cam arm, whereby the fulcrum of said cam arm will be moved to vary the amount of motion transmitted by said cam arm to said arcuate arm, a second cam journaled in the housing driven by said shaft, an arm bearing against said second cam, a flexible member connected with said grinding head, one end of said flexible member connected to said second cam arm, the other end thereof connected to tensioning means mounted in said housing whereby said grinding head is oscillated in a horizontal plane by the movement of said second cam arm on said cam, means for adjusting the relative degree of horizontal movement of said grinding head comprising a frame slidably mounted in said housing, a link connecting said frame to said second cam arm, another link connecting said first link to said flexible member, means for moving said frame in said housing whereby the relative movement of said frame will limit the amount of motion transmitted by said second cam arm to said grinding head, adjustable means controlling the rotation of said first mentioned cam with said second cam, whereby the vertical and horizontal movement imparted to said grinding head will be synchronized, an arm pivoted at one end in said housing for lateral arcuate movement about its pivot point, means for moving said arm arcuately laterally, a second threaded shaft carried by said arm, an arbor bearing a saw to be sharpened, mounted on said shaft for longitudinal movement thereon by the rotation of said second shaft, means for rotating said second shaft and a second finger guiding said saw relatively to said grinding head, supplemental adjusting means for said saw feeding finger.

11. A sharpening machine comprising a housing, an arcuate arm, a grinding head carried by said arcuate arm comprising a rotatable shaft journaled in said arm, a motor supported by said shaft and a grinding wheel mounted on the spindle of said motor, a driven shaft journaled in said housing, a cam fast on said driven shaft, a cam arm bearing on said cam and connected with said arcuate arm, said cam arm adapted to raise and lower said arcuate arm, means for adjusting the relative degree of vertical movement of said arcuate arm comprising a link pivoted at one end in said housing and slidably connected at the other end with said cam arm, means for moving said link longitudinally on said cam arm whereby the fulcrum of said cam arm will be moved to vary the amount of motion transmitted by said cam arm to said arcuate arm, a second cam journaled in the housing driven by said shaft, an arm bearing against said second cam, a flexible member connected with said grinding head, one end of said flexible member connected to said second cam arm, the other end thereof connected to tensioning means mounted in said housing whereby said grinding head is oscillated in a horizontal plane by the movement of said second cam arm on said cam, means for adjusting the relative degree of horizontal movement of said grinding head comprising a frame slidably mounted in said housing, a link connecting said frame to said second cam arm, another link connecting said first link to said flexible member, means for moving said frame in said housing whereby the relative movement of said frame will limit the amount of motion transmitted by said second cam arm to said grinding head, adjustable means controlling the rotation of said first mentioned cam with said second cam, whereby the vertical and horizontal movement imparted to said grinding head will be synchronized, an arm pivoted at one end in said housing for lateral arcuate movement about its pivot point, means for moving said arm arcuately laterally, a second threaded shaft carried by said arm, an arbor bearing a saw to be sharpened, mounted on said second shaft for longitudinal movement thereon by the rotation of said second shaft, means for rotating said second shaft and a second finger guiding said saw relatively to said grinding head.

12. A saw sharpening machine comprising a housing, an arcuate arm, a grinding head carried by said arcuate arm comprising a rotatable shaft journaled in said arm, a motor supported by said shaft and a grinding wheel mounted on the spindle of said motor, a driven shaft journaled in said housing, a cam fast on said driven shaft, a cam arm bearing on said cam and connected with said arcuate arm, said cam arm adapted to raise and lower said arcuate arm, means for adjusting the relative degree of vertical movement of said arcuate arm comprising a link pivoted at one end in said housing and slidably connected at the other end with said cam arm, means for moving said link longitudinally on said cam arm whereby the fulcrum of said cam arm will be moved to vary the amount of motion transmitted by said cam arm to said arcuate arm, a second cam journaled in the housing driven by said shaft, an arm bearing against said second cam, a flexible member connected with said grinding head, one end of said flexible member connected to said second cam arm, the other end thereof connected to tensioning means mounted in said housing whereby said grinding head is oscillated in a horizontal plane by the movement of said second cam arm on said cam, means for adjusting the relative degree of horizontal movement of said grinding head comprising a frame slidably mounted in said housing, a link connecting said frame to said second cam arm, another link connecting said first link to said flexible member, means for moving said frame in said housing whereby the relative movement of said frame will limit the amount of motion transmitted by said second cam arm to said grinding head, adjustable means controlling the rotation of said first mentioned cam with said second cam whereby the vertical and horizontal movement imparted to said grinding head will be synchronized, a second threaded shaft journaled in said housing, an arbor bearing the saw to be sharpened mounted for longitudinal movement thereon, means for rotating said second shaft and other means for moving said second shaft arcuately laterally in the plane of the saw, a saw feeding finger engaging a tooth of the saw and means for moving said saw feeding finger laterally in time with the movement of said grinding head and a second finger guiding said saw relatively to said grinding head, supplemental adjusting means for said saw feeding finger.

JOHN F. PRIBNOW.
EUGENE F. MITCHELL.